United States Patent
Okazawa et al.

(10) Patent No.: US 9,787,860 B2
(45) Date of Patent: Oct. 10, 2017

(54) IMAGE FORMING APPARATUS WITH OPTION FOR DISABLING NEAR-FIELD COMMUNICATION AND DIRECT WIRELESS COMMUNICATION

(71) Applicant: CANON KABUSHIKI KAISHA, Tokyo (JP)

(72) Inventors: Takashi Okazawa, Tokyo (JP); Masamichi Tanji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/052,078

(22) Filed: Feb. 24, 2016

(65) Prior Publication Data

US 2016/0255213 A1     Sep. 1, 2016

(30) Foreign Application Priority Data

Feb. 26, 2015   (JP) ................. 2015-037433

(51) Int. Cl.
*H04N 1/00*  (2006.01)
*H04W 4/00*  (2009.01)
*H04W 76/02* (2009.01)
*G06F 3/12*  (2006.01)

(52) U.S. Cl.
CPC ..... *H04N 1/00106* (2013.01); *H04N 1/00307* (2013.01); *H04N 1/00411* (2013.01); *H04W 4/008* (2013.01); *H04W 76/023* (2013.01); *H04N 2201/006* (2013.01); *H04N 2201/0055* (2013.01); *H04N 2201/0094* (2013.01)

(58) Field of Classification Search
CPC .............. G06F 3/1292; H04N 1/00106; H04N 1/00307; H04N 2201/006; H04W 4/008; H04W 76/023

USPC .............................................. 358/1.15, 1.16
See application file for complete search history.

(56) References Cited

U.S. PATENT DOCUMENTS

| | | | |
|---|---|---|---|
| 9,402,182 B1* | 7/2016 | Henzl | H04B 5/0025 |
| 2013/0144793 A1* | 6/2013 | Royston | H04W 4/001 |
| | | | 705/72 |
| 2014/0094117 A1* | 4/2014 | Rajendran | H04W 12/04 |
| | | | 455/41.1 |
| 2014/0293328 A1* | 10/2014 | Wakizaka | G06F 3/1292 |
| | | | 358/1.15 |

FOREIGN PATENT DOCUMENTS

JP     2013-157736 A     8/2013

OTHER PUBLICATIONS

NFC 101: How to transfer any kind of file using NFC and Wi-Fi Direct posted on Mar. 5, 2014 by Rajesh Pandey. Retrieved by the Examiner from http://www.androidbeat.com/2014/03/transfer-file-using-nfc-wifi-direct/ on Jan. 8, 2017.*

* cited by examiner

*Primary Examiner* — Eric A Rust
(74) *Attorney, Agent, or Firm* — Canon U.S.A., Inc. IP Division (57) ABSTRACT

When a near field communication (NFC) function is set to be enabled, an information processing apparatus starts, upon startup, an operation in a direct wireless communication mode. When the NFC function is set to be disabled, the information processing apparatus starts an operation in the direct wireless communication mode in response to an external operation instruction.

12 Claims, 11 Drawing Sheets

400 SETTING SCREEN

400 SETTING SCREEN

600 MENU SCREEN

FIG.6B

610 WIRELESS CONNECTION SCREEN

IMAGE FORMING APPARATUS WITH OPTION FOR DISABLING NEAR-FIELD COMMUNICATION AND DIRECT WIRELESS COMMUNICATION

BACKGROUND

Field

Aspects of the present invention generally relates to an information processing apparatus capable of operating in a direct wireless communication mode.

Description of the Related Art

Mobile terminals such as smartphones and tablet personal computers (PC) have wireless communication functions. As usage of the wireless communication function, for example, the function is used for transmitting a photograph or a document stored in a mobile terminal to a printer by wireless communication and printing it by the printer.

When the mobile terminal executes wireless communication with an information processing apparatus such as a printer, the mobile terminal needs to connect to an access point to establish the wireless communication. As a method for establishing the wireless communication, a handover method using near field communication (NFC) is known (Japanese Patent Application Laid-Open No. 2013-157736). A handover is a method for obtaining connection information (for example, a service set identifier (SSID) of an access point) necessary for executing the wireless communication from an NFC tag using proximity wireless communication such as the NFC and establishing the wireless communication based on the obtained connection information. By the handover, a user can establish wireless communication between a mobile terminal and an information processing apparatus, such as a printer, by simply touching (bringing) the mobile terminal to the information processing apparatus.

On the other hand, the information processing apparatus can operate in a direct wireless communication mode in which the information processing apparatus itself acts as an access point. When operating in, for example, an access point mode as the direct wireless communication mode, the information processing apparatus generates an SSID for allowing the mobile terminal to connect to and acts as the access point having the generated SSID. The SSID generated in the access point mode is written into the NFC tag, and thus, the above-described handover can be realized without separately preparing an access point different from the information processing apparatus and the mobile terminal.

When the handover using the NFC is performed, it is desirable that necessary information is already written into the NFC tag when a user brings the mobile terminal close to the information processing apparatus.

However, in the case of a conventional information processing apparatus, in order to operate the information processing apparatus in the direct wireless communication mode, a user is required to issue an instruction to the information processing apparatus to operate in the direct wireless communication mode. Therefore, according to the conventional information processing apparatus, the information processing apparatus does not operate in the direct wireless communication mode at a timing when a user touches the information processing apparatus with the mobile terminal, and the SSID to be written into the NFC tag is not generated yet. It is inconvenient for a user since the user needs to first issue an instruction to the information processing apparatus to operate in the direct wireless communication mode, and then to touch the mobile terminal to the information processing apparatus.

SUMMARY

An aspect of the present invention is directed to the solution of the above-described issues. An information processing apparatus according to an aspect of the present invention includes a proximity wireless communication tag, a wireless communication unit configured to operate in a direct wireless communication mode in which the information processing apparatus and an external apparatus execute direct wireless communication, and a control unit configured to control the wireless communication unit to start an operation in the direct wireless communication mode, wherein the control unit determines a timing of causing the wireless communication unit to start an operation in the direct wireless communication mode based on a setting indicating whether the proximity wireless communication tag is used or not set in the information processing apparatus.

Further features of aspects of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the attached drawings. The exemplary embodiments which will be described below do not restrict aspects of the invention according to the claims. All of combinations of the features described in the exemplary embodiments are not always essential to the means for solution according to aspects of the invention.

Figure 1:
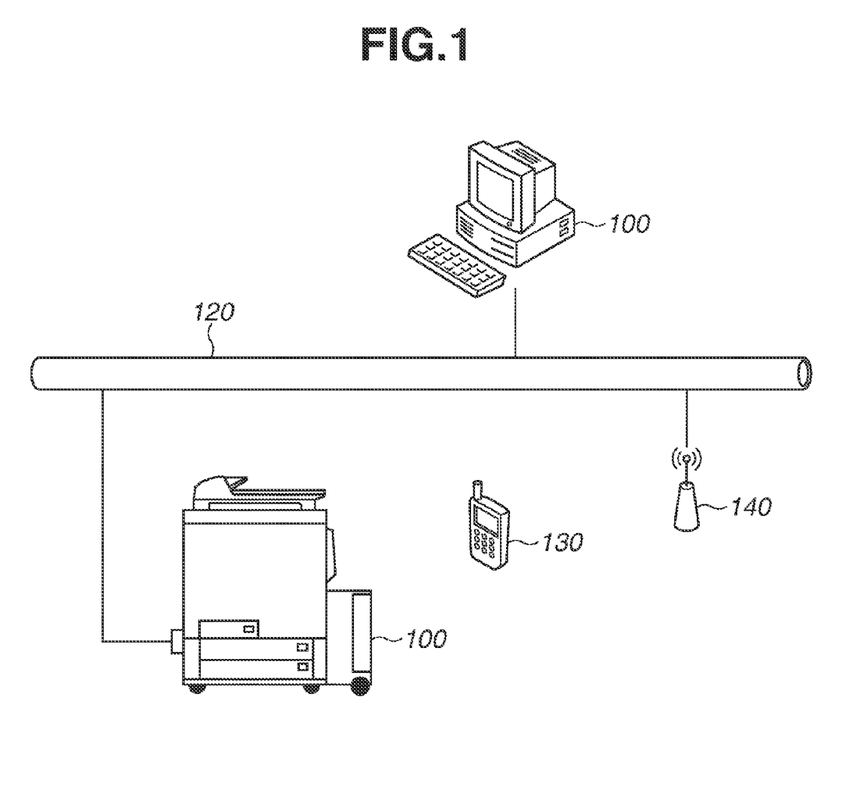
FIG. 1 illustrates a configuration of a print system.

First, a configuration of a print system according to a first exemplary embodiment is described with reference to FIG. 1. A printing apparatus 100 is connected to a network 120 and can communicate with external apparatuses, such as a PC 110 and a mobile terminal 130, via the network 120. The PC 110 transmits print data to the printing apparatus 100 via the network 120. The mobile terminal 130 transmits print data to the printing apparatus 100 via an access point 140. The printing apparatus 100 which received the print data can execute print processing based on the received print data.

The printing apparatus 100 can operate in an access point mode. When the printing apparatus 100 operates in the access point mode, the printing apparatus 100 generates an SSID and acts as the access point. The mobile terminal 130 connects to the SSID generated by the printing apparatus 100, so that the direct wireless communication can be established between the printing apparatus 100 and the mobile terminal 130 without mediating a relay device, such as the access point 140.

Further, the printing apparatus 100 can execute proximity wireless communication based on the NFC. When a user touches (brings) the mobile terminal 130 to the NFC tag of the printing apparatus 100, the mobile terminal 130 obtains tag information (information written into the NFC tag) from the NFC tag using the NFC. The tag information includes an Internet protocol (IP) address of the printing apparatus 100 and the SSID generated by the printing apparatus 100 operating in the access point mode. The mobile terminal 130 which obtained the tag information connects to the SSID included in the tag information, namely the printing apparatus 100. Accordingly, the wireless communication is established between the printing apparatus 100 and the mobile terminal 130. A user of the mobile terminal 130 can establish the wireless communication between the printing apparatus 100 and the mobile terminal 130 by a simple operation, that is to touch the mobile terminal 130 to the NFC tag of the printing apparatus 100.

Next, a configuration of the printing apparatus 100 is described with reference to FIG. 2. A multifunction peripheral is assumed as the printing apparatus 100 according to the present exemplary embodiment, however, the printing apparatus 100 may be a printer without a scanner function.

A central processing unit (CPU) 201 reads a control program stored in a read only memory (ROM) 202 to execute various types of processing for controlling operations of the printing apparatus 100. The CPU 201 is connected to other units by a bus 200. The ROM 202 stores a control program. A random access memory (RAM) 203 is used as a main memory and a temporary storage area, such as a work area of the CPU 201. A hard disk drive (HDD) 204 stores various data pieces, such as print data and a scan image.

In the case of the printing apparatus 100, one CPU 201 executes each processing illustrated in below described flowcharts, however, other forms may be adopted. For example, a plurality of CPUs can execute each processing in the below described flowcharts cooperatively with each other. In addition, a part of the processing in the flowcharts may be executed by a hardware circuit.

A wireless communication unit 205 has a wireless local area network (LAN) function and executes the wireless communication with the access point 140. Further, the wireless communication unit 205 can operate in the access point mode. When the wireless communication unit 205 operates in the access point mode, the wireless communication unit 205 acts as the access point, and thus the mobile terminal 130 and the printing apparatus 100 can establish the direct wireless communication therebetween.

An NFC tag 212 executes the proximity wireless communication based on the NFC with the mobile terminal 130. The NFC tag 212 is an example of a proximity wireless communication tag which can be read by an external apparatus using the proximity wireless communication.

Figure 3:
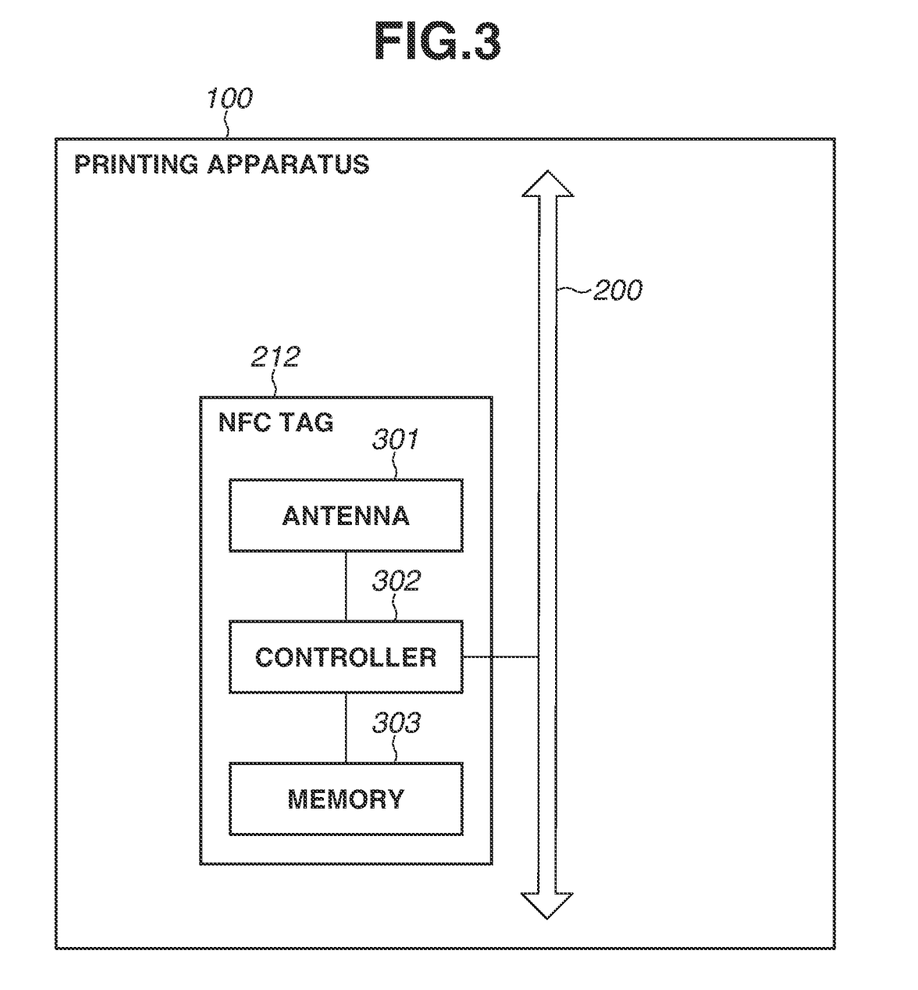
FIG. 3 illustrates a configuration of an NFC tag 212.

A configuration of the NFC tag 212 is described below in further detail with reference to FIG. 3. The NFC tag 212 includes an antenna 301, a controller 302, and a memory 303.

The antenna 301 is used for executing the wireless communication with an external apparatus. The controller 302 is connected to the bus 200 and controls operations of the antenna 301 and writes the tag information into the memory 303 according to an instruction from the CPU 201. The memory 303 stores the tag information written by the controller 302. The tag information stored in the memory 303 can be read by the mobile terminal 130 using the NFC.

Figure 2:
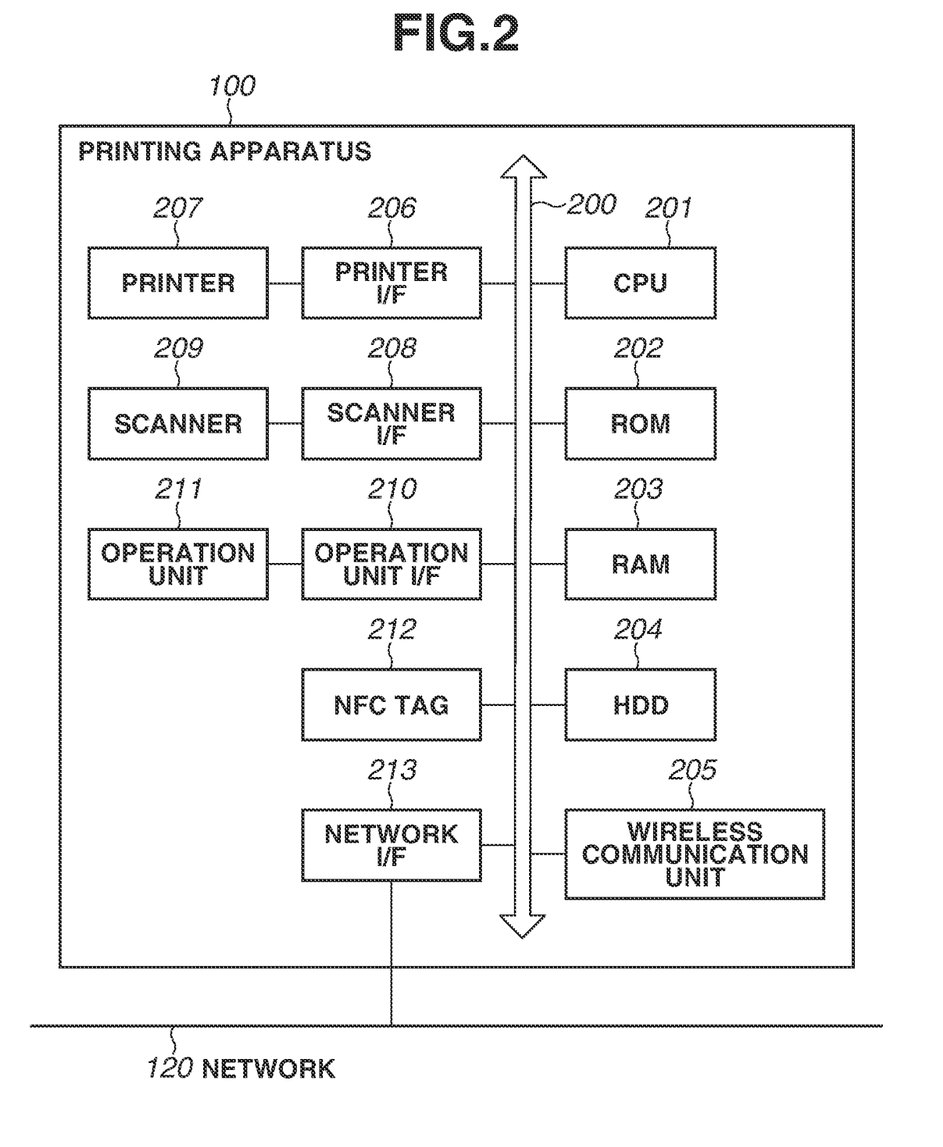
FIG. 2 illustrates a configuration of a printing apparatus 100.

The description returns to FIG. 2. A printer interface (I/F) 206 connects a printer 207 and the bus 200. The printer 207 executes print processing on a sheet based on print data received from an external apparatus, a scan image generated by a scanner 209, and the like.

A scanner I/F 208 connects the scanner 209 and the bus 200. The scanner 209 reads a document and generates a scan image. The scan image generated by the scanner 209 is printed by the printer 207 or stored in the HDD 204.

An operation unit I/F 210 connects an operation unit 211 and the bus 200. The operation unit 211 includes a liquid crystal display unit having a touch panel function and a keyboard and displays various operation screens. A user can input an instruction and information to the printing apparatus 100 via the operation unit 211.

A network I/F 213 connects to the network 120 and executes communication with an external apparatus on the network. The network I/F 213 receives print data transmitted from an external apparatus, and the printer 207 executes print processing based on the received print data.

The printing apparatus 100 is described as an example of the information processing apparatus which can operate in the access point mode. The information processing apparatus to which aspects of the present invention can be applied is not limited to the printing apparatus 100. As long as it can operate in the access point mode, aspects of the present invention can be applied to various electronic devices, such as a digital camera, a video camera, a smartphone, and a tablet PC.

As described above, the printing apparatus 100 can operate in the access point mode. The present exemplary embodiment is characterized by controlling a timing of starting an operation in the access point mode and a timing of generating the SSID. Especially, the present exemplary embodiment is characterized by switching the timing of starting the operation in the access point mode and the timing of generating the SSID according to whether the proximity wireless communication function like the NFC is enabled or disabled in the printing apparatus 100. The characteristic processing is described in detail below.

Figure 4:
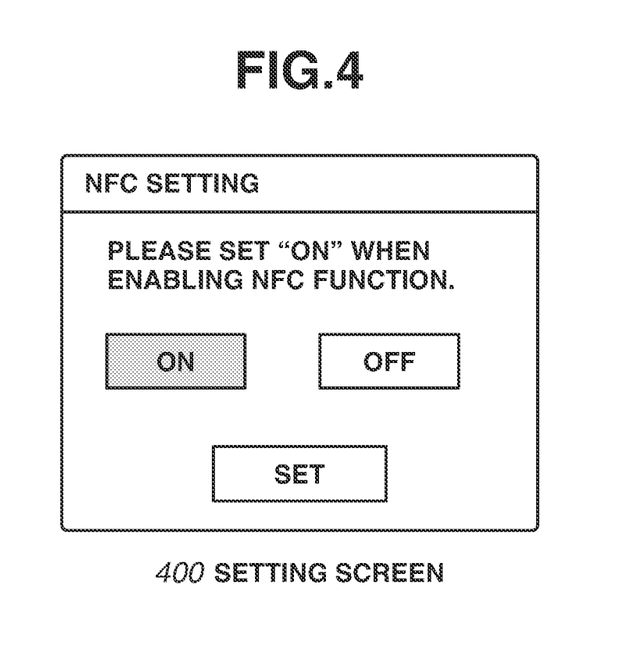
FIG. 4 illustrates a setting screen for setting an NFC function to be enabled or disabled.

First, a configuration for setting the proximity wireless communication function to be enabled or disabled is described. A setting screen 400 in FIG. 4 is a screen displayed by the operation unit 211 and used to set the NFC function to be enabled or disabled. When a user (for example, a system administrator) uses the NFC function, namely wants to perform the handover using the NFC tag 212, the user just needs to select "ON" on the setting screen 400.

On the other hand, when the NFC function is not used, the user just needs to select "OFF" on the setting screen 400. When the NFC function is disabled, power supply to the NFC tag 212 is stopped, so that if the user touches the mobile terminal 130 to the NFC tag 212, no response is returned. Further, when the NFC function is disabled, writing of the tag information is not executed to the memory 303 of the NFC tag 212. Therefore, if the mobile terminal 130 tries to read the tag information, the mobile terminal 130 cannot obtain the tag information.

When a user selects either of "ON" and "OFF" on the setting screen 400 and presses a set button, a setting result on the setting screen 400 is stored as a device setting in the memory such as the HDD 204.

Next, a timing that the printing apparatus 100 operating in the access point mode generates the SSID is described together with an operation procedure of a user. The timing that the printing apparatus 100 generates the SSID is switched according to whether the NFC function is enabled or disabled, so that it is described in two cases, when the NFC function is enabled, and when it is disabled.

Figure 5A:
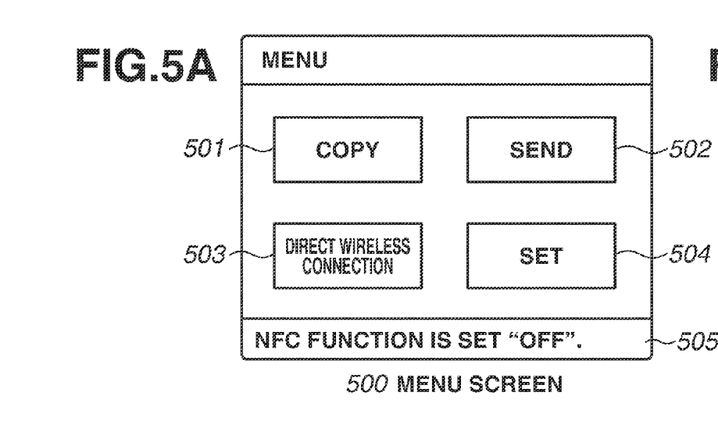
FIGS. 5A to 5D illustrates screens which are displayed when the NFC function is set to be enabled.

First, the generation timing of the SSID when the NFC function is disabled is described with reference to FIGS. 5A to 5D. A menu screen 500 in FIG. 5A is displayed by the operation unit 211 and used as an initial screen displayed when the printing apparatus 100 is started up. In a display area 505, a message indicating that the NFC function is disabled is displayed.

A button 501 is for using a copy function. When a user selects the button 501, a copy screen is displayed. A button 502 is for using a SEND function (a function of transmitting a document image read by the scanner 209 to an external apparatus on the network 120). When a user selects the button 502, a SEND screen is displayed. A button 504 is for displaying various setting screens.

A button 503 is for displaying a screen regarding the access point mode of the printing apparatus 100. When a user selects the button 503, the operation unit 211 displays a wireless connection screen 510 in FIG. 5B.

Figure 5B:
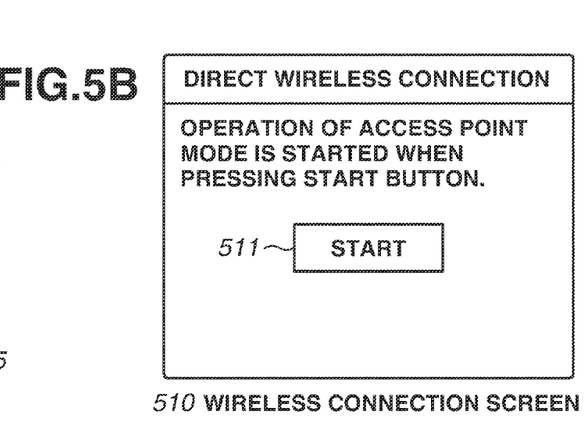

When the NFC function is disabled, the printing apparatus 100 does not operate in the access point mode until a user instructs the printing apparatus 100 to operate in the access point mode. A start button 511 is displayed on the wireless connection screen 510, and when a user selects the start button 511, the printing apparatus 100 starts an operation in the access point mode.

When the printing apparatus 100 operates in the access point mode, it is necessary to supply power to the wireless communication unit 205 and to bring the wireless communication unit 205 into an operating state, and thus power consumption is increased. When the NFC function is disabled, the printing apparatus 100 does not operate in the access point mode until a user issues an instruction, accordingly the power supply to the wireless communication unit 205 can be stopped, and the power consumption can be reduced.

In response to that the start button 511 is selected on the wireless connection screen 510, the printing apparatus 100 starts the operation in the access point mode and generates the SSID and a connection key. When the NFC function is disabled, a timing that the printing apparatus 100 generates the SSID and the connection key is a timing when a user selects the start button 511.

Figure 5C:
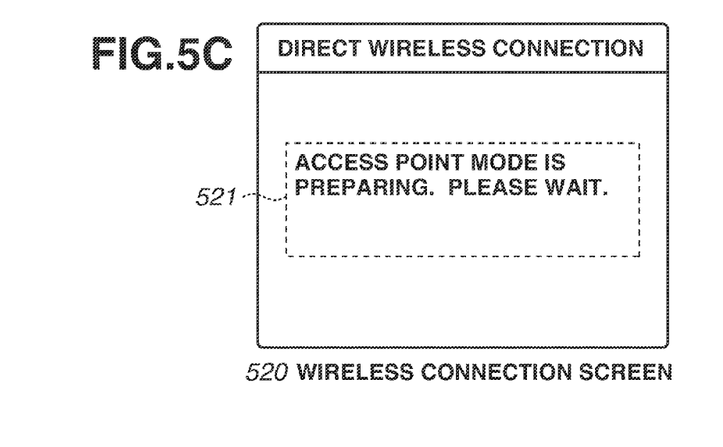

While the printing apparatus 100 executes processing for operating in the access point mode including the generation of the SSID and the connection key, the operation unit 211 displays a wireless connection screen 520 in FIG. 5C. In a display area 521 of the wireless connection screen 520, a message indicating that an operation in the access point mode is being prepared is displayed.

Figure 5D:
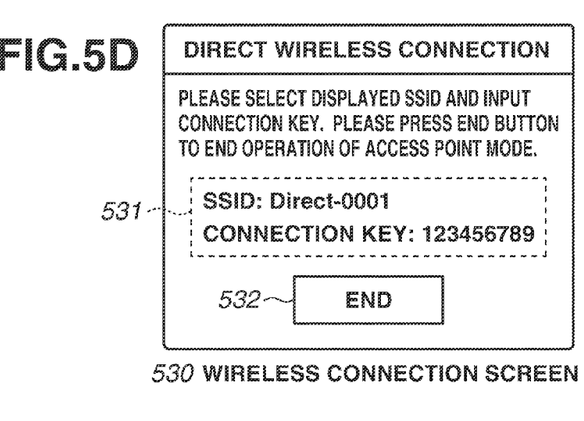

When the generation of the SSID and the connection key is complete, the operation unit 211 displays a wireless connection screen 530 in FIG. 5D. In a display area 531, the SSID and the connection key generated by the printing apparatus 100 are displayed. A user selects the SSID displayed in the display area 531 from among a list of SSIDs of surroundings which is displayed as a result of an access point search on the operation screen of the mobile terminal 130. Then, the connection key displayed in the display area 531 is input, and the wireless communication is established between the mobile terminal 130 and the printing apparatus 100. An end button 532 is also displayed on the wireless connection screen 530. When a user selects the end button 532, the printing apparatus 100 terminates the operation in the access point mode.

The generation timing of the SSID when the NFC function is disabled is described above. When the NFC function is disabled, a timing that the printing apparatus 100 generates the SSID of the access point mode is a timing when a user selects the start button 511.

Figure 6A:
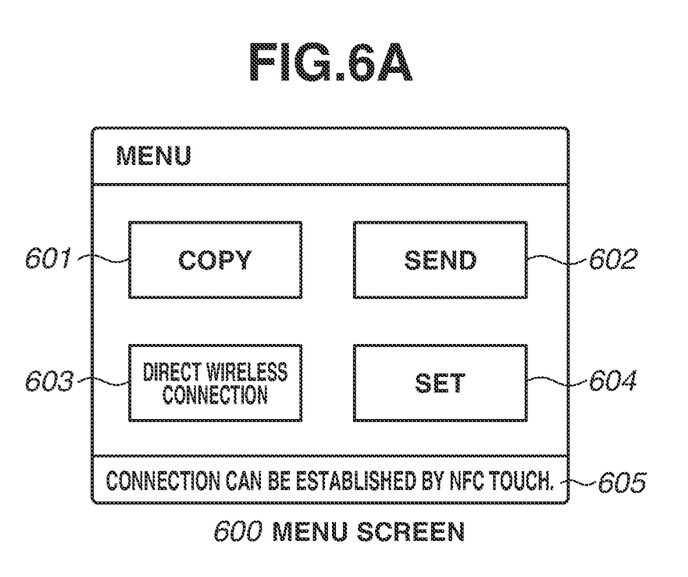
FIGS. 6A and 6B illustrates screens which are displayed when the NFC function is set to be disabled.

Next, the generation timing of the SSID when the NFC function is enabled is described with reference to FIGS. 6A and 6B. A menu screen 600 in FIG. 6A is displayed by the operation unit 211 and used as an initial screen displayed when the printing apparatus 100 is started up. Unlike the menu screen 500 in FIG. 5A, a message indicating that the NFC function is enabled is displayed in a display area 605. Buttons 601, 602, 603, and 604 on the menu screen 600 are respectively similar to the buttons 501, 502, 503, and 504 on the menu screen 500 in FIG. 5A, and thus descriptions thereof are omitted.

When the NFC function is enabled, it is desirable that the information necessary for executing the handover is written into the NFC tag 212 in advance before a user touches the mobile terminal 130 to the NFC tag 212. Thus, when the NFC function is enabled, the printing apparatus 100 starts an operation in the access point mode when the printing apparatus 100 is started up. Then, the SSID generated by the printing apparatus 100 for operating in the access point mode is written into the NFC tag 212.

Figure 6B:
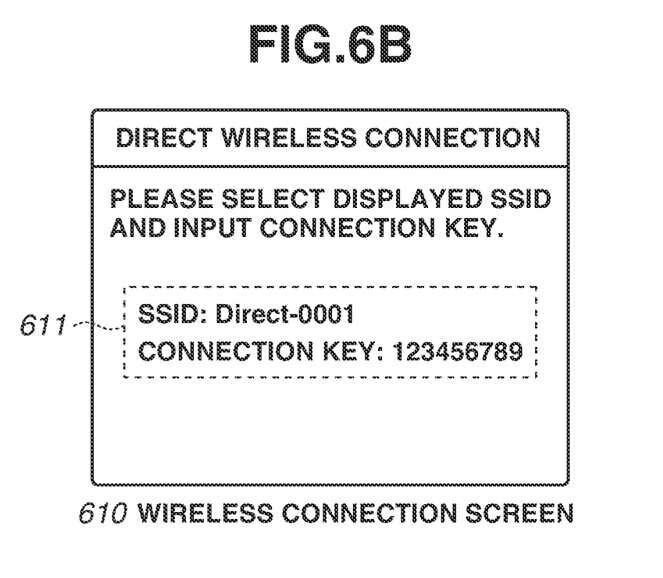

When a user selects the button 603 on the menu screen 600, the operation unit 211 displays a wireless connection screen 610 in FIG. 6B. In a display area 611, the SSID and the connection key generated by the printing apparatus 100 are displayed. Unlike in the case that the NFC function is disabled as described in FIG. 5, the printing apparatus 100 starts the operation in the access point mode at the time of startup, and thus screens such as the wireless connection screen 510 and the wireless connection screen 520 are not displayed. Further, when the NFC function is enabled, the printing apparatus 100 is constantly in a state operating in the access point mode, and thus the end button 532 on the wireless connection screen 530 is not displayed on the wireless connection screen 610.

The generation timing of the SSID when the NFC function is enabled is described above. When the NFC function is enabled, a timing that the printing apparatus 100 generates the SSID of the access point mode is a timing when the printing apparatus 100 is started up. When the NFC function is enabled, the printing apparatus 100 starts the operation in the access point mode and generates the SSID without receiving an operation instruction like the start button 511 from a user.

Figure 7:
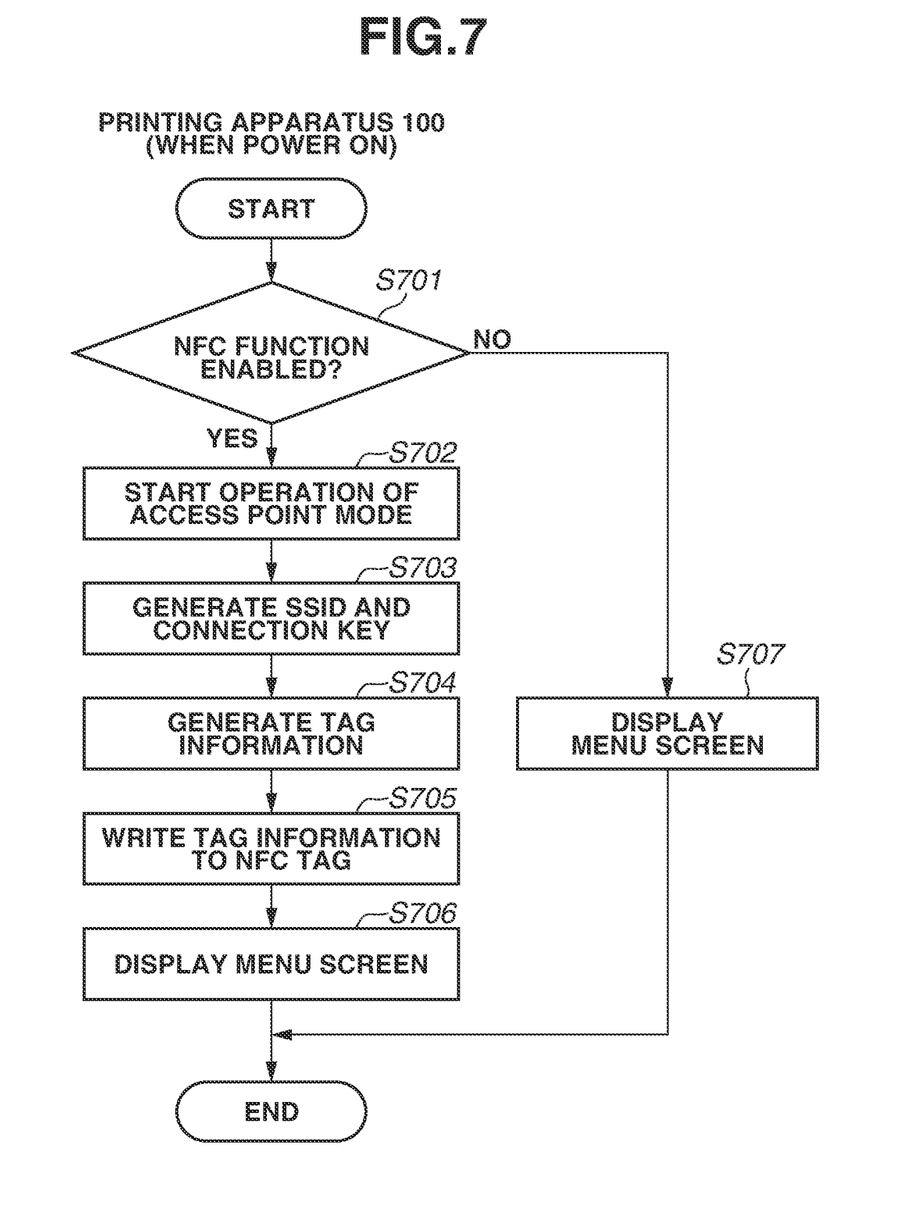
FIG. 7 is a flowchart illustrating processing executed when the printing apparatus 100 is started up.

Next, initial processing executed when the printing apparatus 100 is started up is described with reference to a flowchart in FIG. 7. Each step in the flowchart in FIG. 7 is processed by the CPU 201 developing and executing a control program stored in the memory such as the ROM 202 in the RAM 203.

When a power source of the printing apparatus 100 is turned ON, the CPU 201 executes the initial processing at the time of the startup. As one of the initial processing, in step S701, the CPU 201 determines whether the NFC function is enabled. The determination in step S701 is executed by the CPU 201 referring to a setting result in the setting screen 400 stored in the memory such as the HDD 204. When the CPU 201 determines that the NFC function is enabled (YES in step S701), the processing proceeds to step S702. On the other hand, when the CPU 201 determines that the NFC function is not enabled, in other words, the NFC function is disabled (NO in step S701), the processing proceeds to step S707.

Next, step S702 is described. Since the NFC function is enabled, in step S702, the CPU 201 instructs the wireless communication unit 205 to start the operation in the access point mode. In response to the instruction, the wireless communication unit 205 starts the operation in the access point mode.

Next, in step S703, the CPU 201 generates the SSID and the connection key used in the access point mode. According to the present exemplary embodiment, the CPU 201 generates the SSID having "Direct-XXXX (XXXX is a random number)", however, a generation method of the SSID is not especially limited. For example, a fixed SSID may be used. According to the present exemplary embodiment, the CPU 201 generates a random number as the connection key, however, a generation method of the connection key is not especially limited. For example, a fixed connection key may be used. Further, according to the present exemplary embodiment, it is described that the CPU 201 generates the SSID and the connection key, however, other forms may be used. For example, the CPU 201 may instruct the wireless communication unit 205 to generate the SSID and the connection key used in the access point mode, and the wireless communication unit 205 which received the instruction may generate the SSID and the connection key. The SSID generated in step S703 is stored in the memory such as the HDD 204.

Next, in step S704, the CPU 201 generates the tag information to be written into the NFC tag 212. A configuration of the tag information is described in detail below with reference to FIG. 8.

Figure 8:
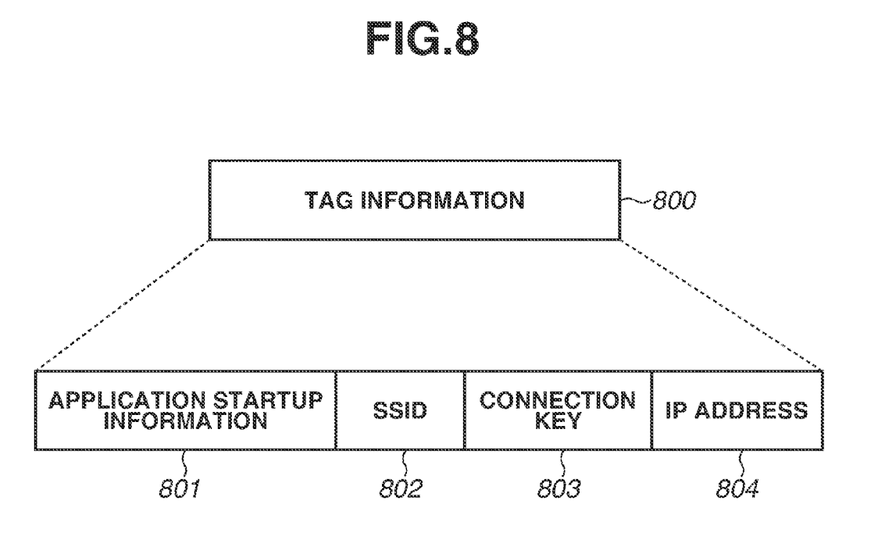
FIG. 8 illustrates a configuration of tag information.

Tag information 800 in FIG. 8 is an example of the tag information generated in step S704. The tag information 800 is described in a format referred to as an NFC Data Exchange Format (NDEF) specified by NFC Forum.

The tag information 800 includes at least application startup information 801, an SSID 802, a connection key 803, and an IP address 804. The application startup information 801 is information for starting up a specific application in the mobile terminal 130 which reads the tag information 800. For example, when identification information of a specific print application corresponding to the printing apparatus 100 is specified, the mobile terminal 130 which read the tag information 800 can start up the specific print application. The SSID 802 and the connection key 803 are the SSID and the connection key generated in step S703. The IP address 804 is the IP address of the printing apparatus 100.

The configuration of the tag information 800 is not limited to the one described in FIG. 8. For example, other information such as a media access control (MAC) address of the printing apparatus 100 may be included.

Next, in step S705, the CPU 201 writes the tag information 800 generated in step S704 into the NFC tag 212. The CPU 201 instructs the controller 302 of the NFC tag 212 to write the tag information 800 into, and the controller 302 writes the tag information 800 into the memory 303 of the NFC tag 212.

Next, in step S706, the CPU 201 displays the menu screen. In step S706, the CPU 201 controls the operation unit 211 to display the menu screen 600 in FIG. 6A. On the menu screen 600, the message indicating that the NFC function is enabled is displayed.

Next, step S707 is described. When the NFC function is disabled in the printing apparatus 100, the processing in step S707 is executed. In step S707, the CPU 201 displays the menu screen. In step S707, the CPU 201 controls the operation unit 211 to display the menu screen 500 in FIG. 5A. On the menu screen 500, the message indicating that the NFC function is disabled is displayed.

Figure 9:
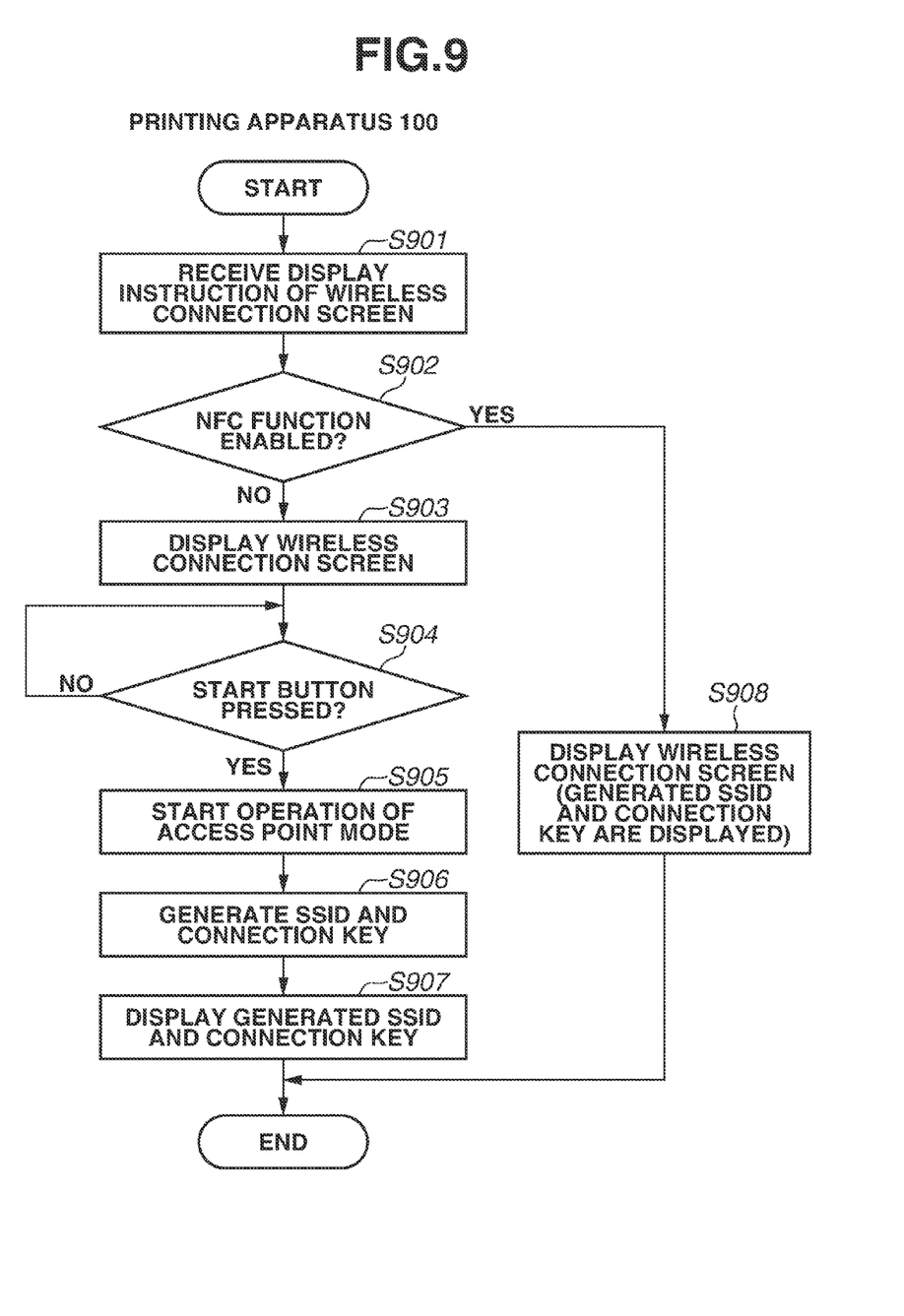
FIG. 9 is a flowchart illustrating processing executed when a wireless connection screen is displayed.

Next, processing executed after the startup of the printing apparatus 100 is described with reference to a flowchart in FIG. 9. Each step in the flowchart in FIG. 9 is processed by the CPU 201 developing and executing a control program stored in the memory such as the ROM 202 in the RAM 203.

When the printing apparatus 100 is started up, the operation unit 211 displays the menu screen (the menu screen 500 or the menu screen 600). In step S901, the CPU 201 receives an instruction to display the wireless connection screen from a user. When the user selects the button 503 on the menu screen 500 or selects the button 603 on the menu screen 600, in step S901, the CPU 201 determines that the instruction to display the wireless connection screen is received from the user.

Next, in step S902, the CPU 201 determines whether the NFC function is enabled. The determination in step S902 is executed by the CPU 201 referring to the setting result in the setting screen 400 stored in the memory such as the HDD 204. When the CPU 201 determines that the NFC function is enabled (YES in step S902), the processing proceeds to step S908. On the other hand, when the CPU 201 determines that the NFC function is not enabled, in other words, the NFC function is disabled (NO in step S902), the processing proceeds to step S903.

Next, step S903 is described. When the NFC function is not enabled, in other words, the NFC function is disabled, in step S903, the CPU 201 controls the operation unit 211 to display the wireless connection screen 510 in FIG. 5B. When the NFC function is disabled, the printing apparatus 100 does not operate in the access point mode and generate the SSID used in the access point mode at the time of startup. Therefore, in order to receive an operation instruction of the access point mode from the user, in step S903, the operation unit 211 displays the wireless connection screen 510 in FIG. 5B.

Next, in step S904, the CPU 201 determines whether the start button 511 is pressed (selected) by the user. When it is determined that the start button 511 is pressed (YES in step S904), the processing proceeds to step S905, whereas if it is determined that the start button 511 is not pressed (NO in step S904), the processing is waited until the start button 511 is pressed.

Next, in step S905, the CPU 201 controls the wireless communication unit 205 to start the operation in the access point mode. Then, in step S906, the CPU 201 generates the SSID and the connection key used in the access point mode. In step S906, the CPU 201 generates the SSID and the connection key used in the access point mode by the generation method similar to that described in step S703. While the CPU 201 generates the SSID and the connection key used in the access point mode, the operation unit 211 displays the wireless connection screen 520 in FIG. 5C.

Next, in step S907, the CPU 201 controls the operation unit 211 to display the SSID and the connection key generated in step S906. The screen displayed by the operation unit 211 in step S907 is the wireless connection screen 530 in FIG. 5D. The user selects the SSID displayed on the wireless connection screen 530 from among a list of SSIDs in the surroundings which is displayed as the result of the access point search on the operation screen of the mobile terminal 130. Then, the user inputs the connection key displayed on the wireless connection screen 530, and the wireless communication is established between the mobile terminal 130 and the printing apparatus 100.

Next, step S908 is described. When the processing in step S908 is executed, the NFC function is enabled. As described in FIG. 7, the printing apparatus 100 has already started the operation in the access point mode at the time of startup and generated the SSID and the connection key used in the access point mode. Thus, in step S908, the CPU 201 controls the operation unit 211 to display the wireless connection screen 610 in FIG. 6B. The already generated SSID and connection key are displayed on the wireless connection screen 610.

The method for controlling the timing of generating the SSID used in the access point mode is described above with reference to FIGS. 7 and 9. According to the present exemplary embodiment, the timing of starting the operation in the access point mode and the generation timing of the SSID used in the access point mode are switched based on whether the NFC function is enabled or not.

When the NFC function is enabled, the printing apparatus 100 starts the operation in the access point mode at the timing when the printing apparatus 100 is started up and generates the SSID used in the access point mode.

On the other hand, when the NFC function is disabled, the printing apparatus 100 does not start the operation in the access point mode at the timing when the printing apparatus 100 is started up. Further, since the operation in the access point mode is not started, the SSID used in the access point mode is also not generated. The printing apparatus 100 starts the operation in the access point mode at the timing when an operation instruction of the access point mode (for example, selection of the start button 511) is received from a user and generates the SSID used in the access point mode.

Next, a timing of deleting the generated SSID is described in two cases, when the NFC function is enabled, and when it is disabled.

Figure 10:
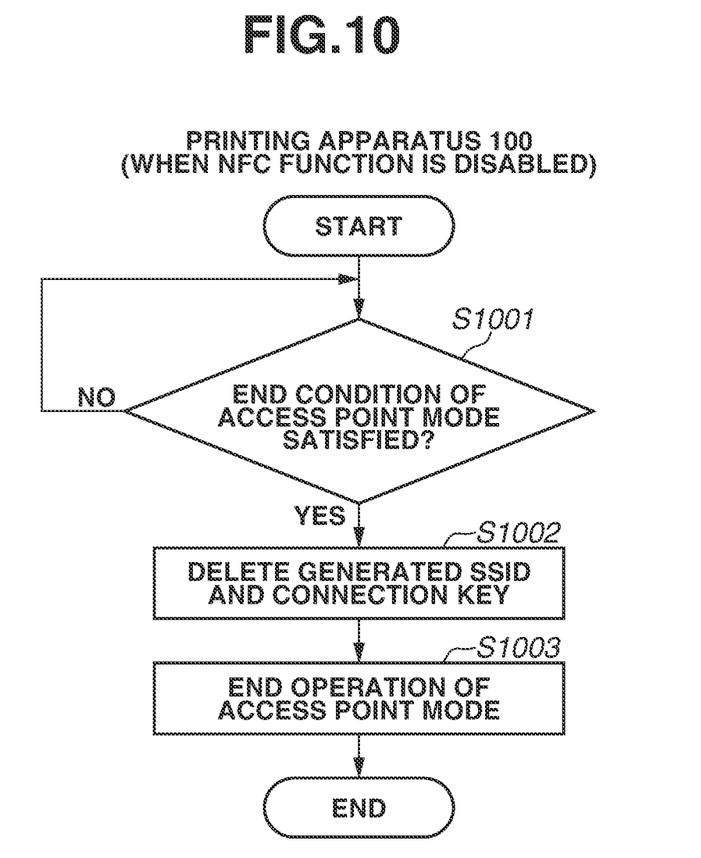
FIG. 10 is a flowchart illustrating processing for deleting an SSID.

First, a timing of deleting the SSID stored in the memory such as the HDD 204 when the NFC function is disabled is described with reference to a flowchart in FIG. 10. Each step in the flowchart in FIG. 10 is processed by the CPU 201 developing and executing a control program stored in the memory such as the ROM 202 in the RAM 203.

The printing apparatus 100 operates in the access point mode, and the operation unit 211 displays the wireless connection screen 530 in FIG. 5D. In step S1001, the CPU 201 determines whether an end condition of the access point mode is satisfied. According to the present exemplary embodiment, the end condition of the access point mode is satisfied when any of following conditions is satisfied.

The end button 532 is pressed by a user.

Wireless connection is not established to the generated SSID for a predetermined time period after displaying the wireless connection screen 530.

Wireless connection is disconnected from a communication partner device after the wireless connection is established to the generated SSID.

No data communication is performed between the communication partner device for a predetermined time period after the wireless connection is established to the generated SSID.

In step S1001, when the CPU 201 determines that the end condition of the access point mode is satisfied (YES in step S1001), the processing proceeds to step S1002. On the other hand, when the CPU 201 determines that the end condition of the access point mode is not satisfied (NO in step S1001), the processing is waited until the end condition of the access point mode is satisfied.

Next, in step S1002, the CPU 201 deletes the SSID and the connection key generated in step S906. Then, in step S1003, the CPU 201 controls the wireless communication unit 205 to terminate the operation in the access point mode.

As described above, when the NFC function is disabled, the SSID and the connection key generated in step S906 are deleted at the timing of terminating the operation in the access point mode. Further, new SSID and connection key are generated at a timing when a user presses the start button 511 again on the wireless connection screen 510 in FIG. 5B.

Figure 11:
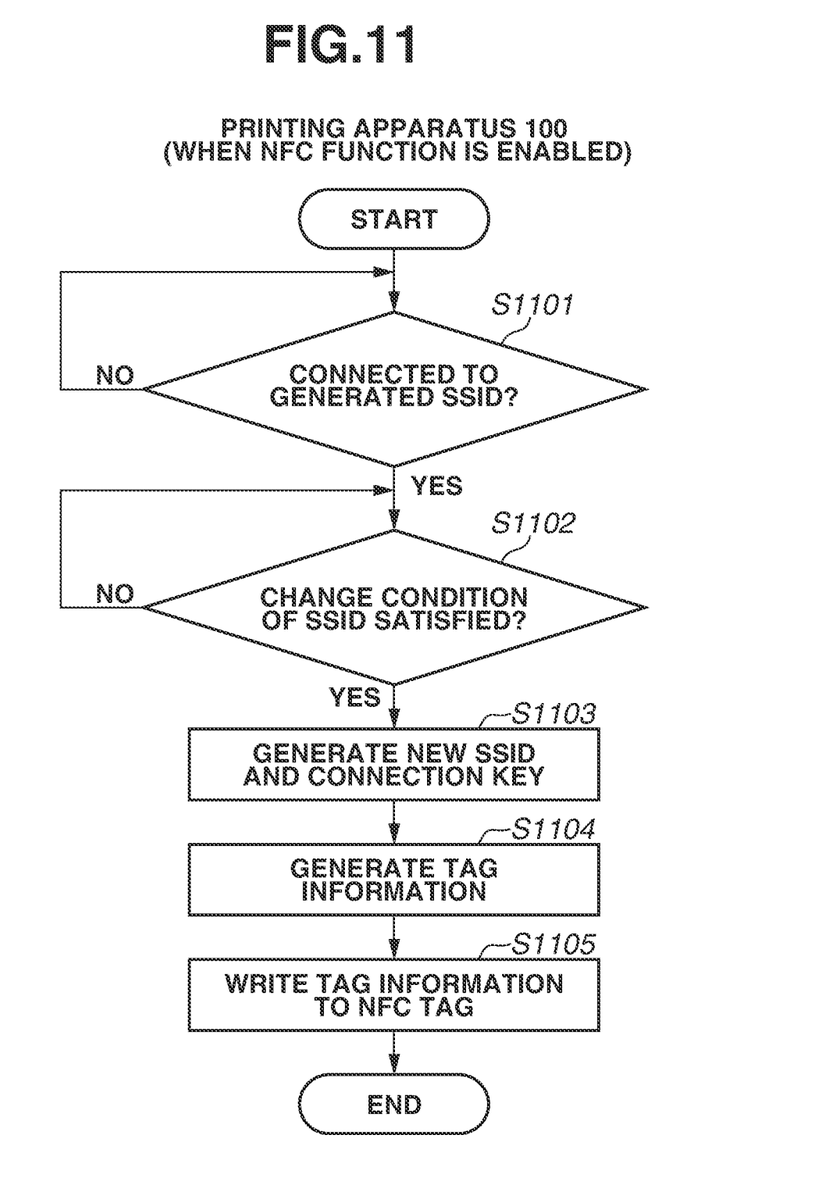
FIG. 11 is a flowchart illustrating processing for generating a new SSID.

Next, a timing of deleting the generated SSID when the NFC function is enabled is described with reference to a flowchart in FIG. 11. Each step in the flowchart in FIG. 11 is processed by the CPU 201 developing and executing a control program stored in the memory such as the ROM 202 in the RAM 203.

The printing apparatus 100 generates the SSID and the connection key and starts the operation in the access point mode at the timing of startup. In step S1101, the CPU 201 determines whether wireless connection is established to the generated SSID. When the wireless connection is established to the generated SSID (YES in step S1101), the processing proceeds to step S1102. On the other hand, when the wireless connection is not established to the generated SSID (NO in step S1101), the processing is waited until the wireless connection is established.

Next, in step S1102, the CPU 201 determines whether a change condition of the SSID used in the access point mode is satisfied. According to the present exemplary embodiment, the change condition of the SSID is satisfied when any of following conditions is satisfied.

Wireless connection is disconnected from a communication partner device connected to the SSID.

No data communication is performed between the communication partner device connected to the SSID for a predetermined time period.

In step S1102, when the CPU 201 determines that the change condition of the SSID is satisfied (YES in step S1102), the processing proceeds to step S1103. On the other hand, when the CPU 201 determines that the change condition of the SSID is not satisfied (NO in step S1102), the processing is waited until the change condition of the SSID is satisfied.

Next, in step S1103, the CPU 201 generates new SSID and connection key. In step S1103, the new SSID and connection key are generated by the generation method similar to that described in step S703.

Next, in step S1104, the CPU 201 generates tag information to be written into the NFC tag 212. The tag information generated in step S1104 is similar to the tag information 800 described in FIG. 8, and the SSID and the connection key newly generated in step S1103 are used for the SSID 802 and the connection key 803.

Next, in step S1105, the CPU 201 writes the tag information generated in step S1104 into the NFC tag 212. The CPU 201 instructs the controller 302 of the NFC tag 212 to write the tag information into, and the controller 302 writes the tag information into the memory 303 of the NFC tag 212.

As described above, when the NFC function is enabled, the SSID and the connection key generated in step S703 are deleted and the new SSID and connection key are generated at a timing of terminating the connection to the access point mode.

Further, when the NFC function is enabled, new tag information is generated at the timing of generating the new SSID and connection key, and the generated new tag information is written into the NFC tag 212. Therefore, when a user touches the NFC tag 212, the latest SSID and connection key can be obtained from the NFC tag 212, and the wireless communication can be established between the printing apparatus 100 and the mobile terminal 130.

Other Embodiments

According to the above-described embodiment, the NFC is described as an example of the proximity wireless communication performed by the printing apparatus 100, however, other wireless communication (for example, Bluetooth (registered trademark)) may be used.

Further, according to the above-described embodiment, the access point mode is described as a specific example of the direct wireless communication mode used by the printing apparatus 100 and the mobile terminal 130 when performing the direct wireless communication, however, other wireless communication methods may be used. For example, in the case of Wi-Fi Direct®, the printing apparatus 100 can act as the access point, so that aspects of the present invention can be applied to the Wi-Fi Direct®.

Further, according to the above-described embodiment, the configuration is described in which the CPU 201 writes the tag information into the NFC tag 212, however, other configurations may be adopted. The CPU 201 may instruct a sub CPU (for example, a sub CPU disposed to the operation unit 211) to perform writing of the tag information, and the instructed sub CPU may write the tag information into the NFC tag 212.

According to aspects of the present invention, the information processing apparatus which can operate in the direct wireless communication mode can generate an SSID at an appropriate timing.

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-037433, filed Feb. 26, 2015, which is hereby incorporated by reference herein in its entirety.

What is claimed is:

1. A printing apparatus comprising:
a printer;
a Near Field Communication (NFC) tag;
a wireless communicator that has a direct wireless communication function in which the printing apparatus and an external apparatus execute wireless communication without using a relay device;
a display that displays a setting screen for a user to set an NFC function using the NFC tag to be enabled or disabled;
a memory; and
a processor that executes instructions stored in the memory to:
determine whether or not the NFC function is set to be enabled;
in a case where the NFC function is set to be enabled, start the direct wireless communication function when the printing apparatus is started up, and write wireless connection information corresponding to the direct wireless communication function into the NFC tag; and
in a case where the NFC function is set to be disabled, start the direct wireless communication function when the printing apparatus receives a predetermined instruction from a user, and the direct wireless communication function is not started when the printing apparatus is started up.

2. The printing apparatus according to claim 1, wherein in a case where the NFC function is set to be disabled, the display further displays a connection screen for a user to input a start instruction for instructing the printing apparatus to start the direct wireless communication function; and
wherein the predetermined instruction is the start instruction input by the user via the connection screen.

3. The printing apparatus according to claim 1, wherein the wireless connection information includes at least a service set identifier (SSID) and identification information of the printing apparatus.

4. The printing apparatus according to claim 3, wherein the identification information is an Internet Protocol (IP) address of the printing apparatus.

5. The printing apparatus according to claim 1, wherein the display further displays a confirmation screen for a user to confirm the wireless connection information,
wherein, in a case where it is determined that the NFC function is set to be disabled, an end object for a user to instruct the printing apparatus to end the direct wireless communication function is displayed on the confirmation screen, and
in a case where it is determined that the NFC function is set to be enabled, the end object is not displayed on the confirmation screen.

6. The printing apparatus according to claim 1, wherein the direct wireless communication function is an access point mode.

7. The printing apparatus according to claim 1,
wherein, in a case where the NFC function is set to be disabled, the processor ends the direct wireless communication function when the wireless connection using the direct wireless communication function between the printing apparatus and the external apparatus is disconnected; and
wherein, in a case where the NFC function is set to be enabled, the processor does not end the direct wireless communication function even when the wireless connection is disconnected.

8. The printing apparatus according to claim 1, wherein starting the direct wireless communication function by the printing apparatus shifts the printing apparatus into a standby state of waiting for occurrence of the wireless connection using the direct wireless communication function; and
wherein the wireless connection using the direct wireless communication function does not occur in a case where the printing apparatus does not start the direct wireless communication function.

9. A method for controlling a printing apparatus including a printer, a Near Field Communication (NFC) tag, a wireless communicator that has a direct wireless communication function in which the printing apparatus and an external apparatus execute wireless communication without using a relay device, and a display that displays a setting screen for a user to set an NFC function using the NFC tag to be enabled or disabled, the method comprising:
determining whether or not the NFC function is set to be enabled; and
in a case where the NFC function is set to be enabled, starting the direct wireless communication function when the printing apparatus is started up, and writing wireless connection information corresponding to the direct wireless communication function into the NFC tag; and
in a case where the NFC function is set to be disabled, starting the direct wireless communication function when the printing apparatus receives a predetermined instruction from a user, and the direct wireless communication function is not started when the printing apparatus is started up.

10. A non-transitory storage medium storing computer executable instructions that cause a computer to execute a method for controlling a printing apparatus including a printer, a Near Field Communication (NFC) tag, a wireless communicator that has a direct wireless communication function in which the printing apparatus and an external apparatus execute wireless communication without using a relay device, and a display that displays a setting screen for a user to set an NFC function using the NFC tag to be enabled or disabled the method comprising:
determining whether or not the NFC function is set to be enabled;
in a case where the NFC function is set to be enabled, starting the direct wireless communication function when the printing apparatus is started up, and writing wireless connection information corresponding to the direct wireless communication function into the NFC tag; and
in a case where the NFC function is set to be disabled, starting the direct wireless communication function when the printing apparatus receives a predetermined instruction from a user, and the direct wireless communication function is not started when the printing apparatus is started up.

11. The printing apparatus according to claim 1, wherein the direct wireless communication function is Wi-Fi Direct.

12. The printing apparatus according to claim 1, wherein the relay device is an access point.

\* \* \* \* \*